Patented Oct. 26, 1943

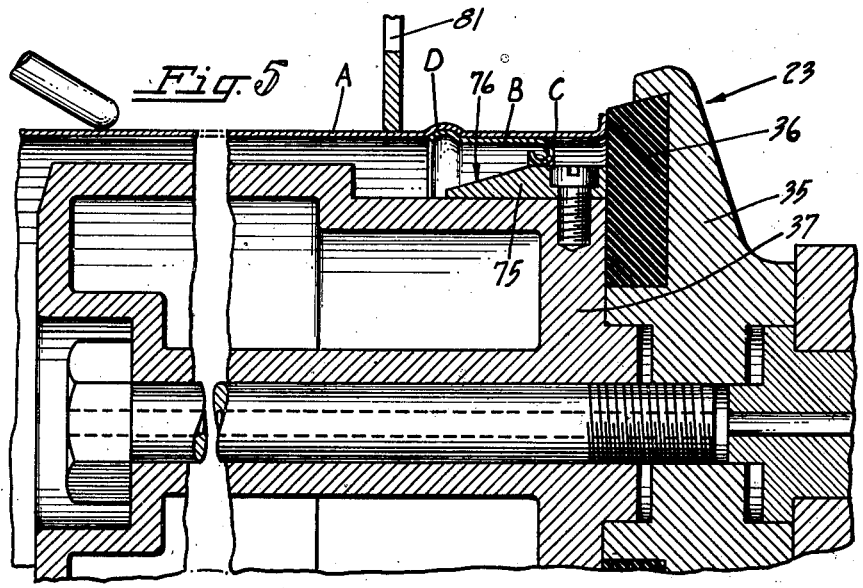
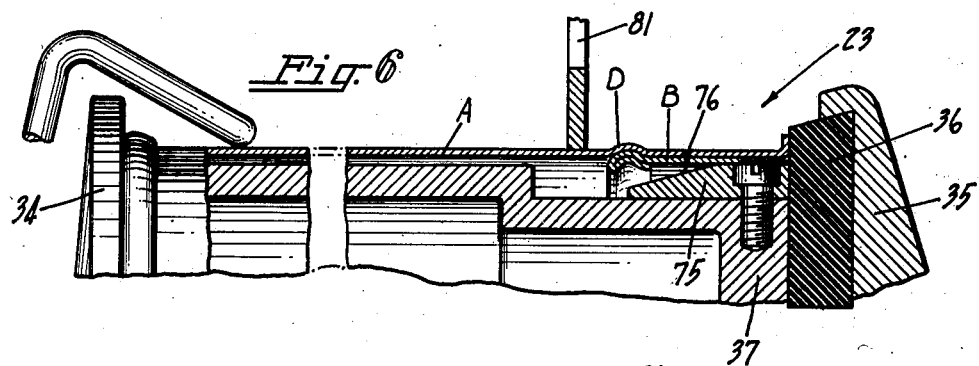
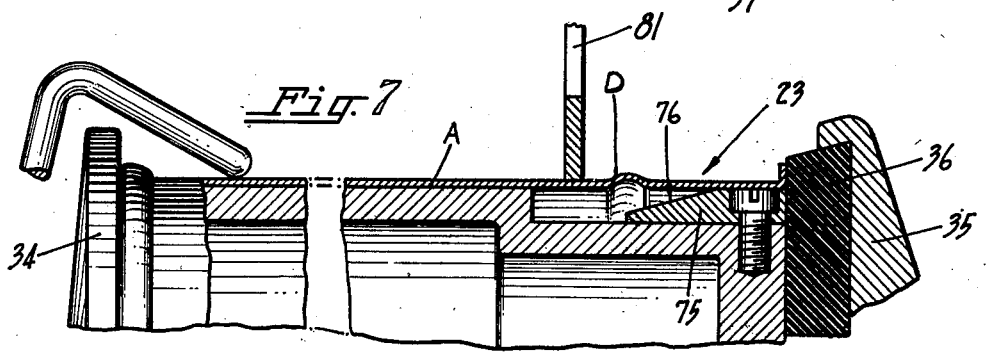

2,332,525

UNITED STATES PATENT OFFICE 2,332,525

CAN TESTING MACHINE

Carl F. Peck, Jersey City, N. J., assignor to American Can Company, New York, N. Y., a corporation of New Jersey Application April 1, 1941, Serial No. 386,379

6 Claims. (Cl. 73—51)

The present invention relates to container or can testing machines in which the cans are subjected to air under pressure to detect those which leak and has particular reference to simultaneously testing the cans for collar bands and utilizing the usual air testing devices to discard cans in which the collar bands are missing or are improperly inserted in addition to the can leak test.

In the manufacture of sheet metal cans in which the collar band is inserted into the can body as a separate member and by high speed machinery, the collar band sometimes is inadvertently omitted or is inserted incorrectly. Such a can when allowed to go through the regular manufacturing processes and when filled and merchandized as usual, causes considerable trouble to the purchaser when opened. The instant invention contemplates the detection and discard of such cans while they are being tested for leaks in the usual way, so that they too will be prevented from being used.

An object therefore of the invention is the provision, in an air testing machine for detecting leaky cans, of devices for testing the cans for interior collar bands, such band testing being carried on simultaneously with the usual testing of the cans for leaks so that both testing operations may be effected in the same machine with a saving of time and operations.

Another object is the provision of such a machine wherein the discarding of detected imperfect cans having collar bands improperly inserted or of imperfect detected cans without any collars, is effected by the same devices which discard a detected leaky can.

Numerous other objects and advantages of the invention will be apparent as it is better understood from the following description, which, taken in connection with the accompanying drawings, discloses a preferred embodiment thereof.

Referring to the drawings.

Figure 1:
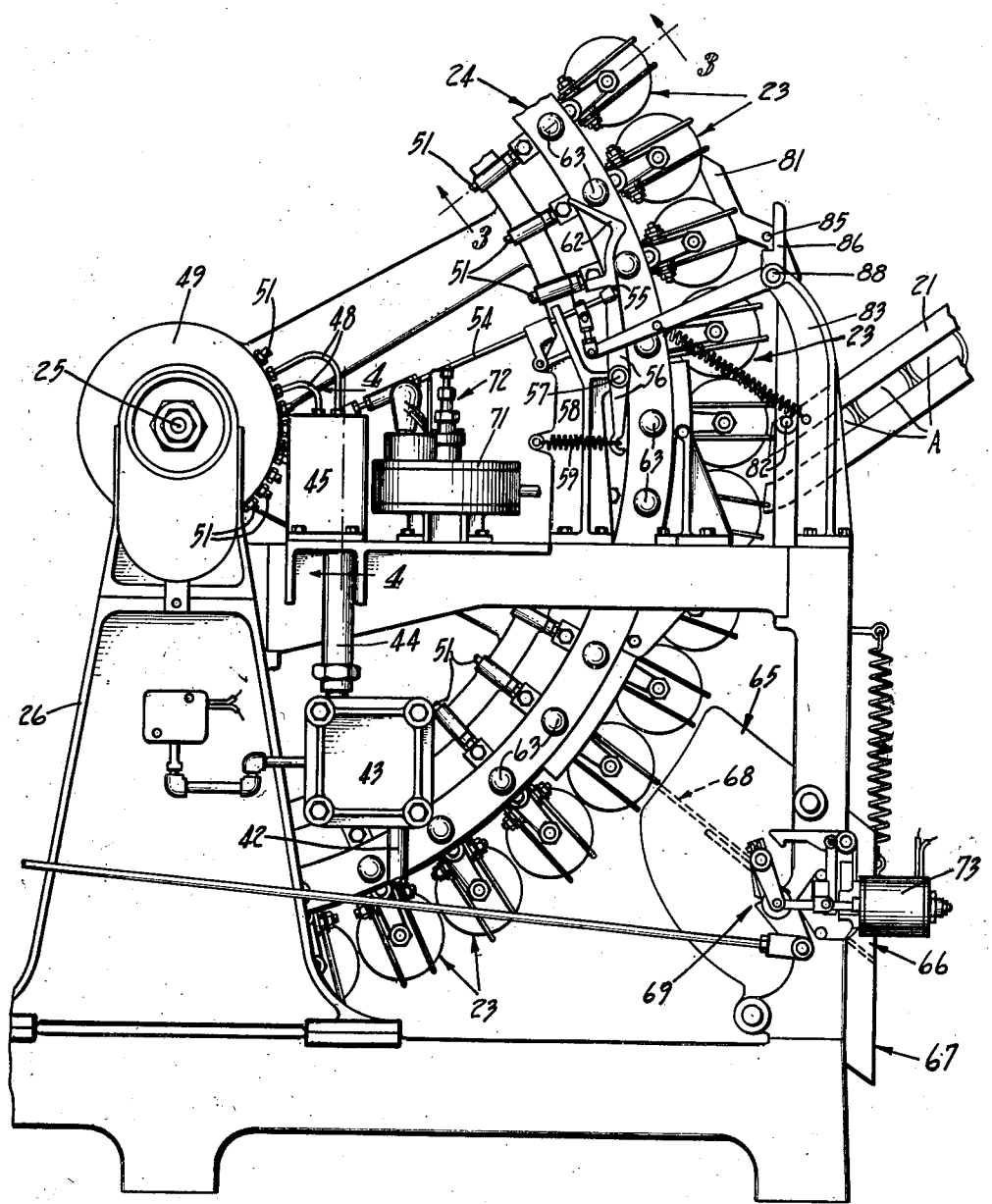
Figure 1 is a side elevation of a portion of a can testing machine embodying the instant invention, with parts broken away and parts shown in section.
Figure 3:
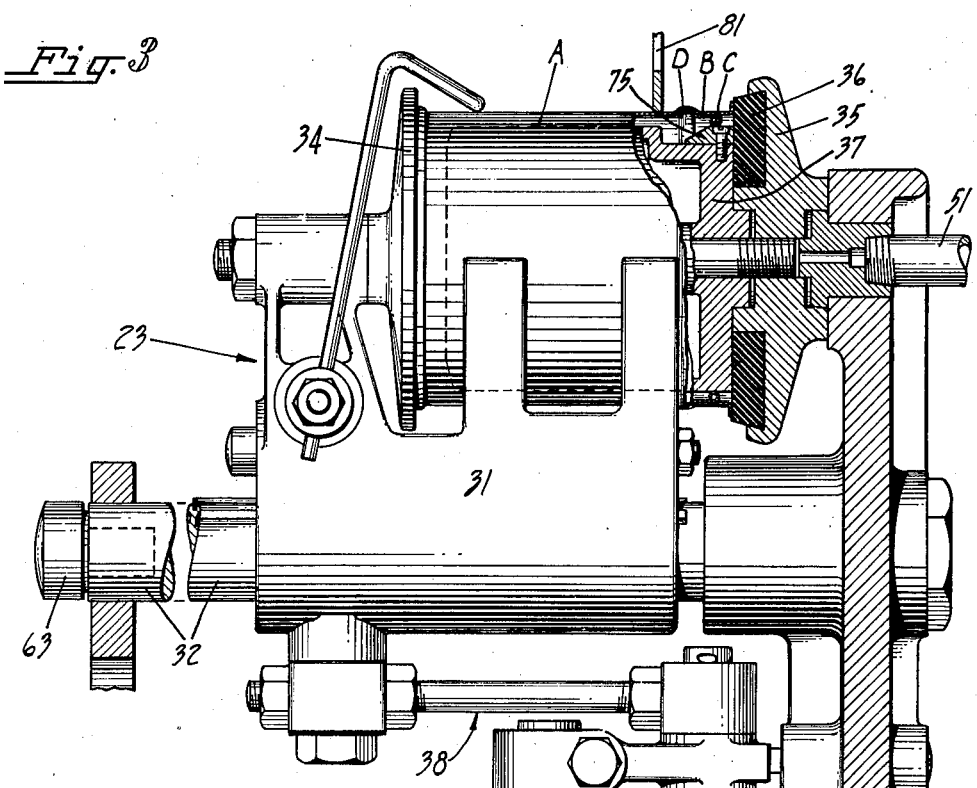
Figure 4:
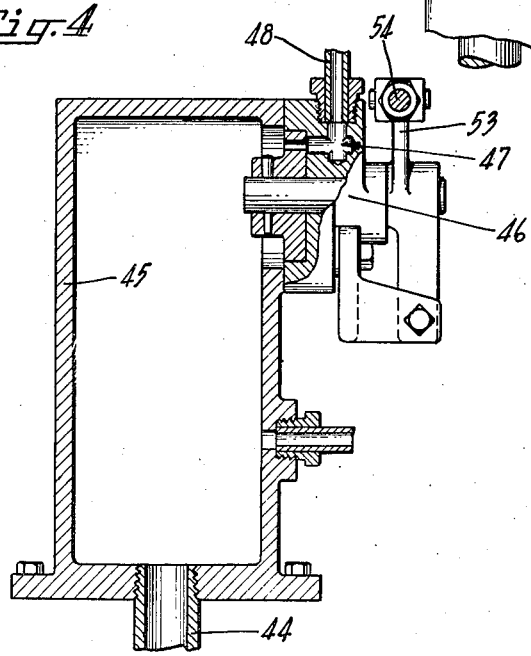

Figs. 3 and 4 are enlarged sectional details taken substantially along the respective lines 3—3 and 4—4 in Fig. 1, with parts broken away; and Figs. 5, 6 and 7 are greatly enlarged sectional views of a portion of the machine showing the collar band end of a can in place, Fig. 5 illustrating the relative position of the machine parts and a can having a correctly inserted collar band, Fig. 6 illustrating the relative position of a can having a collar band incorrectly inserted, and Fig. 7 showing the relative position of a can in which the collar band has been entirely omitted.

As a preferred embodiment of the instant invention the drawings illustrate principal parts of a can testing machine of the character disclosed in United States Patent 2,019,517, issued November 5, 1935, to M. E. Widell. In such a machine sheet metal cans A having one end open are subjected to air under pressure and if found to leak are discharged from the machine by way of a leaky can outlet, while good cans, i. e., cans which do not leak are discharged from the machine by way of a good can outlet.

Figure 2:
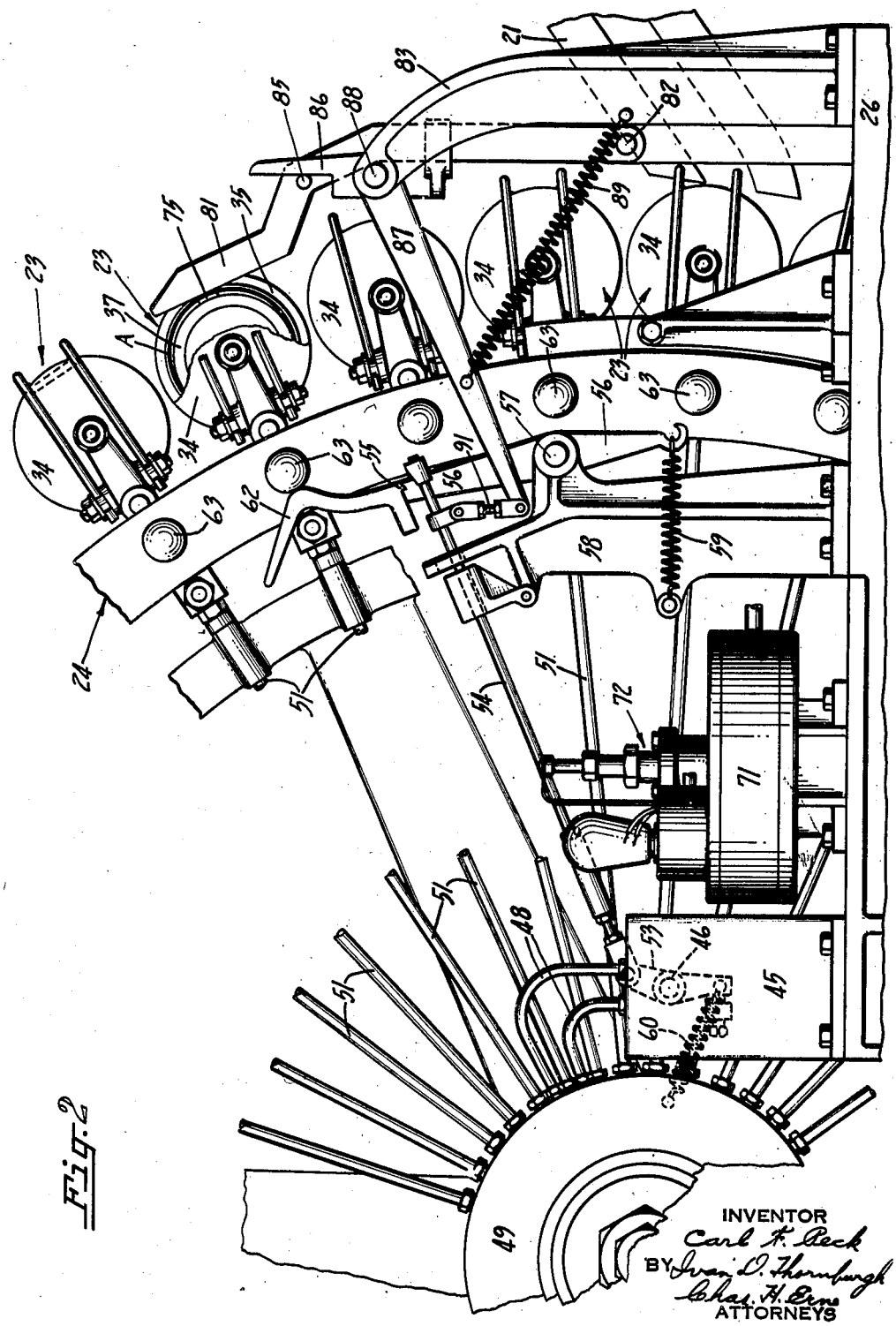
Fig. 2 is an enlarged side elevation of a portion of the machine shown in Fig. 1, with parts broken away.

The cans A to be tested roll on their sides into the machine in a continuous procession by way of an inclined runway 21 (Figs. 1 and 2). At the discharge end of the runway the cans are individually delivered into testing heads 23 which are carried in spaced order around the outside diameter of a rotating testing wheel, generally indicated by the numeral 24. The testing wheel is mounted on a shaft 25 which is journaled in bearings in a machine main frame 26. This shaft is rotated in any suitable manner such as that disclosed in the above mentioned Widell patent.

Each testing head 23 includes a movable cradle 31 (see Fig. 3) in which a can A is received when it is delivered from the entrance runway 21. The cradle is mounted on a slide pin 32 which is secured in the rotating wheel 24. The cradle also carries a clamp pad 34. Opposite this clamp pad there is a stationary pad 35 which is secured to the rotating wheel. This stationary pad carries a resilient sealing ring 36 and a can support mandrel 37.

When a can A is received in a cradle 31, the latter is immediately shifted along its slide pin 32 toward the right as viewed in Fig. 3. This shifting is effected by a link and lever connection 38 which is actuated by any suitable means operating in time with the other moving parts of the machine. Shifting of the cradle pushes the can over the mandrel 37 (Fig. 3) and also brings the clamp pad 34 into clamping position against the can so that the latter is held tightly against the resilient sealing ring 36. The interior of the can is thus completely sealed off from the outside atmosphere. The can is held in this clamped position while it is carried around a circular path of travel with the wheel as it rotates through one cycle.

During this travel of the can, air under pressure is first introduced into its interior. This air is supplied from any suitable source of supply by way of a pipe 42 (Fig. 1) which brings the air into a filter box 43. From the filter box the air passes by way of a pipe 44 into a valve box 45. The air is delivered from this valve box by way of a lever operated rocker valve 46 (Fig. 4) having ports 47 which when open permit air to pass through pipes 48 into a distributor 49 arranged around the hub of the testing wheel 24.

The operation and construction of this distributor 49 is fully explained in the above Widell patent. For the use of this specification it is thought sufficient to explain that the distributor momentarily admits air from the pipes 48 into the clamped can in its head 23 so that the can is completely filled with the air under pressure. This air is delivered through a pipe 51 which connects the distributor with the head.

The charging of the can with air is brought about by actuation of the valve 46. The valve is opened and closed by a valve lever 53 which is connected to one end of an actuating rod 54 (Fig. 2). The opposite end of the rod is normally engaged in a notch 55 of a vertically disposed cam lever 56, as shown in Figs. 1 and 2. The cam lever is mounted on a pivot pin 57 secured in a bracket 58 carried on the machine frame. The lower end of the cam lever is held under tension of a spring 59 having one end connected to the lever and the other end secured to the bracket. The upper end of the cam lever is formed with a cam head 62 which is disposed in the path of travel of buttons 63 formed on the outer ends of the cradle slide pins 32.

Hence as each can in its cradle comes adjacent the cam head 62 of the lever 56, the button 63 associated with this cradle engages the cam head and pushes it inwardly. This rocks the cam lever and thus shifts the actuating rod 54 and the rod in turn shifts the valve lever 53 which opens the valve 46. As soon as the cam head 62 rides off the passing button 63 the spring 59 draws the cam lever 56 back into its normal position. A spring 60 (Fig. 2) secured to the valve lever 53 and to the machine main frame returns the rod to its original position and thus closes the valve.

After a can A has received its charge of air under pressure it remains sealed except in the event it should leak. In this condition the air filled can passes around with the rotating wheel 24 until it arrives at or near a discharge mechanism 65 (Fig. 1) having two outlet chutes 66, 67 into which perfect and imperfect containers are respectively deflected by a pivotally mounted gate 68 controlled by an electro-mechanical actuating device 69.

As the can approaches the discharge mechanism 65, its interior air condition is determined by a detector valve 71 containing a diaphragm which moves upon disturbance from a predetermined balanced condition by reason of leakage earlier occurring in the can. Movement of this diaphragm by air from a leaking can closes an electric switch 72 which is connected with the detector valve 71. Closing of this switch energizes an electric solenoid 73 associated with the discharge gate control or actuating device 69 and thus effects the opening of the gate 68 so that the leaky can will be discharged from the machine by way of the leaky can chute 67. This completes the cycle of a can being tested in the machine.

In the instant invention the cans A to be tested carry interior annular collar bands B (Fig. 5) which fit snugly within the can bodies in engagement with their side walls. The upper or outer edge of each collar band is bent inwardly and downwardly to provide a smooth curled edge C which extends inwardly from the collar band side wall. The lower or inner edge of the collar band is preferably uncurled or is left raw and adjacent this edge the band is expanded outwardly into a bead D formed in the can body to hold the band in proper place. It is these cans that roll down the entrance runway 21 and are placed on the mandrel 37 of the testing heads 23.

The can supporting mandrel 37 of each testing head 23 is somewhat smaller than the inside of the can and is disposed in a slightly eccentric position on the stationary pad 35 of the testing head. On the eccentric side of the mandrel it carries a short centering block or shoe 75 (Figs. 2, 3, 5, 6 and 7) having an inwardly inclined surface 76. The shoe is located close to the resilient ring 36 and its outer surface projects beyond the outer diameter of the mandrel.

While a can A having a correctly inserted collar band B, as shown in Fig. 5, is being pushed onto the mandrel and before it is clamped in position against the stationary head 35 by the clamp pad 34, the curled edge C of the collar band rides up on the shoe 75 as shown in the figure. The shoe projects beyond the mandrel surface a distance sufficient to shift the can on the mandrel into a position concentric with the head 35 and also to effect a snug fit of the can on the mandrel. After the can is thus centered on the head 35 the clamp pad holds it tightly in this position.

If the collar band B is in a reverse position in a can A so that its curled edge C is not in correct position, as clearly shown in Fig. 6, the curled edge C does not ride up on the shoe 75 and hence the can is not centered on the head 35. In a similar manner a can A which has no collar band at all, as shown in Fig. 7, also remains in an eccentric position relative to the testing head 35.

These off center or eccentric positions of a can A on a mandrel 37 are utilized to indicate the wrong position or omission of the collar band in the can. Provision is made for detecting such cans and for preventing the introduction into them of the air under pressure, as hereinbefore explained. Thus the detected can having no collar or an improperly positioned collar is carried through the machine without any air in it and when it reaches the leak detector valve 71, it has the same effect on the valve and registers as a leaking can and is accordingly discarded from the machine by the same devices that operate for discharging a regular leaking can.

Determination of the collar band condition of a can A is brought about by a vertically disposed detector arm 81 (Figs. 1, 2, 3, 5, 6 and 7) which is mounted on a pivot pin 82 secured in a bracket 83 bolted to the machine main frame 26. The upper end of the arm extends into the path of travel of the cans as they begin their cycle through the machine with the rotating tester wheel 24. This upper end of the arm engages against the outside surface of the cans as they move past.

The detector arm 81 carries a pin 85 which engages against a short leg 86 of a lever 87 mounted on a pivot stud 88 carried in the bracket 83. The lever is maintained under pressure of a tension spring 89 having one end connected to the lever and having its opposite end secured to the bracket. The spring pulls down on the lever and this, through the short leg 86 and pin 85 in the detector arm, maintains the latter against the outside surfaces of the cans. The inner end of the lever 87 is also connected by a link 91 to the air valve actuating rod 54.

Hence when a can without a collar band or one in which the collar band is improperly fitted comes adjacent the detector arm 81, the eccentric position of the can effects an inward movement of the detector arm under the strain of the spring 89. This inward movement of the detector arm permits the spring 89 to draw the lever 87 down and thus, through the link 91, the air valve actuating rod 54 is drawn down sufficient to disengage it from the notch 55 in the cam lever 56.

Thus when the button 63 on the cradle slide pin 32 for the testing head, in which the eccentrically positioned detected can is located, comes into engagement with the cam 62 of the lever 56, the latter is actuated as usual but the disconnected valve actuating rod 54 remains stationary. Hence the air valve 46 remains closed and no air is introduced into the detected can.

The detector arm 81 is pushed back into its normal position by the next good or concentrically positioned can A and this lifts the lever 87 back into its normal position. Lifting of the lever 87 raises the air valve actuating rod 54 and it thus reengages in its notch 55 in the cam lever where it is ready to open the valve 46 to admit air into such a good can.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for testing internal collar band containers for leaks and also for the presence of correctly positioned collar bands, the combination of a support head for a container to be tested, valve means for introducing and confining air under pressure in the container on said support head, an air detector for determining the leakage of pressure from said container, a separating mechanism for separating leaking from non-leaking containers as determined by said detector, means on said support head for holding a container with a properly fitted collar band in a position different from the position of a container having an improperly fitted collar band, a collar band detector engageable against the outside of a container on said support head for detecting containers having improperly fitted collar bands, as determined by the position of the container on the support head, and instrumentalities operable by said collar band detector for rendering said valve means inoperable, so that air will not be introduced into a detected container having an incorrectly positioned collar to ensure that such container will be separated in the same manner as a leaky container.

2. In a machine for testing internal collar band containers for leaks and also for the presence of correctly positioned collar bands, the combination of a support head for a container to be tested, valve means for introducing and confining air under pressure in the container on said support head, an air detector for determining leaking from non-leaking containers, means on said support head for holding a container with a properly fitted collar band in a position different from the position of a container having an improperly fitted collar band, a collar band detector engageable against the outside of a container on said support head for detecting containers having improperly fitted collar bands, as determined by the position of the container on the support head, and instrumentalities operable by said collar band detector for rendering said valve means inoperable, so that air will not be introduced into a detected container having an incorrectly fitted and positioned collar band to insure that such container will be classified with and discharged as a leaky container.

3. In a machine for testing internal collar containers for leaks and also for correctly positioned internal collar bands, the combination of a support head for a container to be tested, valve means for introducing and confining air under pressure in the container on said support head for determining leaking from non-leaking containers, a mandrel eccentrically disposed on said head for supporting the container, a tapered shoe on said mandrel engageable with a properly fitted collar in a container positioned on the mandrel for holding said container in a position concentric with said head, a pivotally mounted collar band detector arm engageable with the outside of a container on said support for detecting the presence of eccentrically positioned containers having improperly fitted collar bands therein and containers from which the collar bands have been omitted, and instrumentalities operable by said detector arm for rendering said valve means inoperable, so that air will not be introduced into a container having an improperly fitted or omitted collar band to insure that such imperfect container will be determined and classified as a leaky container.

4. In a machine for testing internal collar containers for leaks and also for correctly positioned collar bands, the combination of a support head for a container to be tested, valve means for introducing and confining air under pressure in the container on said head for determining leaking from non-leaking containers, an actuating rod connecting with said valve means, a cam lever engageable with said actuating rod, means adjacent said head for shifting said cam lever to open and close said valve means, means on said support head for holding a container with a properly fitted collar band in a position different from the position of a container having an improperly fitted collar band, a detector element engageable against the outside of a container on said support head for detecting the presence of containers having improperly fitted collar bands as determined by the different position of such a container on the support head, and a spring held lever connecting with said actuating rod and operable by said detector for withdrawing said rod from engagement with said cam lever to render the valve means inoperable, so that air will not be introduced into a detected container having an improperly fitted collar to insure that such an imperfect container will be determined and classified as a leaking container.

5. In a machine for testing cans, the combination of means for advancing the cans through a predetermined path of travel, means cooperating with said advancing means and insertable into the can interior for detecting the presence of a collar correctly positioned within each of said cans, means for admitting air under pressure to the interior of the cans to detect the presence of leaks therein, means responsive to existing air pressure within a said can for selectively discharging the cans in accordance with the air pressure therewithin, and means actuated by said collar detecting means for holding said air admitting means inoperative to admit air to a can other than having a collar correctly positioned therewithin as determined by said collar detecting means.

6. A machine for testing cans having internally positioned collars, comprising means for advancing the collar cans through a predetermined path of travel, means cooperating with said advancing means and insertable into the can interior for detecting the presence of a collar correctly positioned within each of said cans, means for admitting air under pressure to the interior of the cans to detect the presence of leaks therein, means responsive to a relatively low degree of air pressure existing within a detected leaky can for segregating and separately discharging such imperfect leaky can from the machine, and means actuated by said collar detecting means for holding said air admitting means inoperative to admit air under pressure to a can other than having a collar correctly positioned therewithin, whereby to maintain a low degree of substantially atmospheric pressure within such structurally imperfect can to insure its discharge from the machine together with the said imperfect low pressure leaky cans segregated and discharged by said air pressure responsive means.

CARL F. PECK.